Patented Dec. 11, 1951

2,578,281

UNITED STATES PATENT OFFICE 2,578,281

HALOGENATION OF N-METHYL-4-AMINO-PHENOL

Frederic R. Bean, Rochester, N. Y., assignor to Eastman Kodak Company, Rochester N. Y., a corporation of New Jersey No Drawing. Application May 20, 1949, Serial No. 94,510

8 Claims. (Cl. 260—574)

This invention relates to the halogenation of N-methyl-4-aminophenol.

It is known that N,N-dialkylanilines, or their p-halogen or p-alkyl derivatives, can be halogenated by introducing chlorine or bromine into an aqueous hydrochloric acid solution of the N,N-dialkylanilines, or the aforesaid derivatives thereof. (U. S. Patent 1,777,266). Such N,N-dialkylanilines or the aforesaid derivatives thereof are not readily oxidized, but are sensitive enough to oxidation that other classical methods of halogenation are unsatisfactory.

N-methyl-4-aminophenol, or its acid addition salts, is a very easily oxidized substance and its salts are widely used as photographic developers. Because of its marked sensitivity to oxidizing agents direct halogenation of the compound has not heretofore been satisfactorily accomplished. N-methyl-4-aminophenol is, for example, many times more sensitive to oxidation than N,N-dimethylaniline, p-chloro-N,N-dimethylaniline or N,N-dimethyl-p-toluidine.

Despite the marked sensitivity of N-methyl-4-aminophenol to oxidizing agents, however, I have found that it can be directly chlorinated or brominated to give C-chloro (or C-bromo) or C,C-dichloro (or C,C-dibromo) derivatives, if the chlorination or bromination is carried out in concentrated or near concentrated hydrochloric acid.

It is, accordingly, an object of my invention to provide C-halogenated derivatives of N-methyl-4-aminophenol. A further object is to provide a process for preparing such C-halogenated derivatives. Still another object is to provide concentrated photographic developer solutions comprising such C-chloro, C-bromo, C,C-dichloro, or C,C-dibromo derivatives and hydroquinone. Other objects will become apparent from a consideration of the following examples and description.

The hydrochloric acid useful in practicing my invention must be employed in concentrated, or near concentrated form, since I have found that hydrochloric acid containing an undue amount of water causes oxidation of the N-methyl-4-aminophenol, or its acid addition salts. For example, attempts to chlorinate N-methyl-4-aminophenol sulfate (Elon) in the presence of a 20% hydrochloric acid solution resulted in the severe oxidation of the starting material soon after chlorination had been begun. For the purposes of my invention, therefore, the hydrochloric acid must be employed in concentrated, or near concentrated form. By concentrated acid, I mean hydrochloric acid containing from 27 to 40 percent by weight of hydrogen chloride. I have found that hydrochloric acid containing from 30 to 36 percent by weight of hydrogen chloride is especially useful in practicing my invention, since such acid is more easily obtained from ordinary purchasing sources and is more easily handled. Even more important, when the hydrochloric acid contains from 30 to 36 percent by weight of hydrogen chloride, no cooling of the reaction mixture is necessary, whereas with acids containing less than 30 percent by weight of hydrogen chloride, it is usually advisable to carry out the reaction at lowered temperatures, e. g. 0°–15° C. to retard the oxidation of the aminophenol. When the hydrochloric acid contains from 30 to 36 percent by weight of hydrogen chloride, the reaction can advantageously be carried out at room temperature (20°–25° C.), or temperatures above room temperature.

For the purposes of my invention, temperatures varying from 0°–40° C. can be used to advantage, and although temperatures outside this range can be used, such use is usually less advantageous, however.

The N-methyl-4-aminophenol can be employed either in the form of its free base, or it can be added to the reaction medium in the form of its acid addition salts, e. g. as a hydrochloride, hydroiodide, sulfate, oxalate, etc.

The following examples will serve to illustrate more fully the manner whereby I practice the process of my invention.

EXAMPLE 1

42.7 g. of N-methyl-4-aminophenol sulfate were dissolved in 150 cc. of concentrated hydrochloric acid (sp. gr. 1.19), and chlorine was then bubbled into the solution until 17.5 g. had been absorbed, at the end of which time the reaction mixture had set to a semi-solid mass. The reaction mixture was then poured into a mixture of sodium carbonate and sodium sulfite. The monochlorinated product separated as the free base in the form of a white fluffy mass which was insoluble in water. A 60 percent yield by weight, based on the N-methyl-4-aminophenol sulfate, of monochlorinated product consisting of a mixture of 2-chloro-N-methyl-4-aminophenol and 3-chloro-N-methyl-4-aminophenol was obtained.

EXAMPLE 2

42.7 g. of N-methyl-4-aminophenol sulfate were made up to 150 cc. with concentrated hydrochloric acid (sp. gr. 1.19). A solution of 40 g. of bromine in 50 cc. of glacial acetic acid was added slowly with stirring to the hydrochloric acid solution. The color of the bromine faded rapidly and heat was evolved which was dissipated by the stirring. After all of the color of the bromine had disappeared, the reaction mixture was poured into a strong solution of sodium sulfite, whereupon the free base of the monobrominated product separated out of solution. The product consisted of a mixture of 2-bromo-N-methyl-4-aminophenol and 3-bromo-N-methyl-4-aminophenol. The product was insoluble in water, but dissolved readily in strong hydrochloric acid.

EXAMPLE 3

0.25 mol. of N-methyl-4-aminophenol sulfate was dissolved in 150 cc. of concentrated hydrochloric acid (sp. gr. 1.19) and chlorine was added until 0.25 mol. had been absorbed. The reaction mixture was then neutralized by pouring into a solution of sodium carbonate and sodium sulfite. The free base which separated was extracted with ether. The ether extract was acidified with oxalic acid, and after recrystallizing the monochloro-4-methylaminophenol oxalate from water, it melted at 188°–189° C. with decomposition. The product consisted of both 2-chloro- and 3-chloro isomers, but apparently contained a major portion of the 3-isomer. On analysis the following results were obtained:

| Element | Calculated | Found |
|---|---|---|
| Carbon | 47.4 | 47.19 |
| Hydrogen | 4.48 | 4.53 |
| Nitrogen | 6.91 | 7.04 |
| Chlorine | 18.0 | 17.75 | indicating a structure represented as follows:

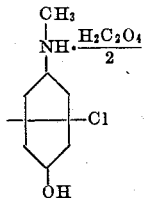

EXAMPLE 4

0.25 mol. of N-methyl-4-aminophenol sulfate was dissolved in 150 cc. of concentrated hydrochloric acid (sp. gr. 1.19) and chlorine was passed through the solution until 0.5 mol. had been absorbed. The mixture was then allowed to sit for several hours while immersed in an ice bath. At the end of this time, the hydrochlorides of a mixture of isomeric dichloro-N-methyl-4-amino-phenols separated out, and after two recrystallizations from water gave a melting point of 201° C. with decomposition. On analysis the following results were obtained:

| Element | Calculated | Found |
|---|---|---|
| Carbon | 36.8 | 36.88 |
| Hydrogen | 3.5 | 3.51 |
| Nitrogen | 6.13 | 6.14 |
| Chlorine | 46.5 | 46.78 | indicating a structure represented as follows:

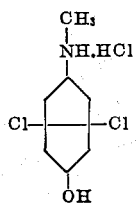

EXAMPLE 5

0.25 mol. of N-methyl-4-aminophenol sulfate was dissolved in 150 cc. of concentrated hydrochloric acid and the solution cooled to 10° C. To this solution 0.25 mol. of bromine was added dropwise over a period of 15 hours. After allowing the reaction mixture to stand for several hours, the precipitated hydrobromide salt was filtered off. It melted at 192°–194° C. On analysis, the following results were obtained:

| Element | Calculated | Found |
|---|---|---|
| Carbon | 29.6 | 28.86 |
| Hydrogen | 3.18 | 2.94 |
| Nitrogen | 4.94 | 4.61 | indicating a structure of the type:

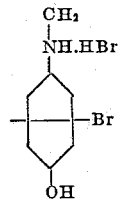

EXAMPLE 6

0.25 mol. of N-methyl-4-aminophenol sulfate was dissolved in 150 cc. of concentrated (sp. gr. 1.19) hydrochloric acid and bromine was added dropwise with stirring to the cooled solution until 0.5 mol. had been absorbed. Agitation was continued for several hours after the addition was completed, and the acidity of the reaction mixture was reduced with 20 per cent sodium hydroxide until it was only slightly acid as indicated by Congo red paper. It was then heated to boiling and filtered through charcoal while hot. On cooling the filtrate yielded a mixture of the hydrochlorides of isomeric dibromo-N-methyl-4-aminophenols. The yield was 95 percent and after three recrystallizations from water, it melted at 214° C. with decomposition. On analysis, the following results were obtained:

| Element | Calculated | Found |
|---|---|---|
| Carbon | 26.6 | 27.0 |
| Hydrogen | 2.52 | 2.63 |
| Nitrogen | 4.42 | 4.50 |
| Halogen | 61.5 | 60.6 |

This analysis indicates that the products obtained had the following structure:

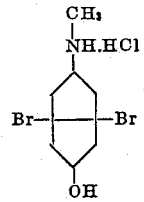

EXAMPLE 7

0.25 mol. of N-methyl-4-aminophenol sulfate was dissolved in 150 cc. of concentrated hydrochloric acid (sp. gr. 1.19) and chlorine was passed through the solution until 0.25 mol. had been absorbed. The reaction mixture was then diluted and neutralized with a solution of sodium hydroxide and sodium carbonate. A base precipitated; which after recrystallization from solvent naphtha had a melting point of 85°–87° C. This insoluble base was then converted into three salts, as follows:

(1) It formed a crude oxalate melting at 152°–156° C., but after one recrystallization from water gave a melting point of 188°–189° C., indicating the original crude was a mixture.
(2) It formed a crude hydrochloride melting at 187–189° C. After one recrystallization it melted at 200°–201° C., and after a second recrystallization it melted at 203° C., indicating a mixture was obtained.
(3) It formed a crude sulfate melting at 213°–215° C., and at 226° C. with decomposition after one recrystallization.

The aqueous residue remaining above was then extracted with ether, and after acidifying separate portions with oxalic acid, dry hydrogen chloride and alcoholic sulfuric acid, it gave salts melting as follows:

Oxalate _____ 187°–189° C.
Hydrochloride _____ 189°–190° C.
Sulfate _____ 227° C. decomp.

All of the above salts were mixed together and then oxidized with dichromic acid (H₂SO₄+Na₂Cr₂O₇)

A pure chloroquinone melting at 56°–57° C. and having the formula:

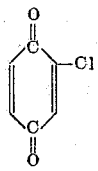

was obtained.

4-bromo-2-chlorophenol was prepared by bromination of 2-chlorophenol, and this product was reacted with methylamine to yield 2-chloro-N-methyl-4-aminophenol, which was isolated as three different salts:

Oxalate M. P. 178° C.
Hydrochloride, M. P. 184°–186° C.
Sulfate M. P. 264° C. decomp.

This data indicates that the monochlorination of N-methyl-4-aminophenol gives a mixture of products represented as follows:

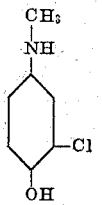

2-chloro-N-methyl-4-aminophenol and

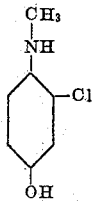

3-chloro-N-methyl-4-aminophenol

The 2-chloro compound (in the form of its salts) is apparently formed to a lesser degree than its 3-chloro isomer.

EXAMPLE 8

N-methyl-4-aminophenol sulfate was then dichlorinated as described in Example 4 above. After two recrystallizations from water, the product melted at 201° C. decomp.., however a second crop of crystals melted at 210° C. decomp. indicating a mixture of two hydrochlorides of different water solubilities. The mixture of hydrochloride crystals was neutralized, extracted with ether and then acidified with oxalic acid. The mixture of crude oxalates melted at 144°–147° C., but after two recrystallizations from water, melted 183° C. decomp.

EXAMPLE 9

N-methyl-4-aminophenol sulfate was dibrominated as described in Example 6 above. The products were oxidized with dichromic acid (H₂SO₄+Na₂Cr₂O₇)

to give a mixture which partially melted at 130°–135° C. and completely melted at 184° C. This compares with a recorded melting point for 2,6-dibromoquinone of 130° C., and 188° C. for 2,5-dibromoquinone.

The above data indicate that dihalogenation gives a mixture containing a structure of the type:

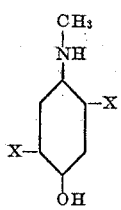

and at least one other of the following two types:

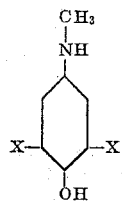 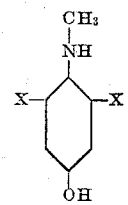

wherein X stands for a chlorine or bromine atom.

The halogenated products obtained according to my invention are characterized by their property of not causing a precipitation from the developing solution as compared with the unhalogenated products from which they are obtained. This solubility renders them valuable as addenda in photographic developer solutions, since little or no activity as a developer is lost by the halogenation while the solubility is materially increased. This improved solubility is particularly useful in the preparation of concentrated developer solutions, such as those used in X-ray photography, etc. Such solutions have a high solids content in proportion to the amount of water present, and many such solutions yield undesirable precipitates after short periods of time. Concentrated photographic developer solutions comprising mixtures of N-methyl-4-aminophenol sulfate and hydroquinone are useful in the photographic arts, however, such solutions have the disadvantage that they lose their activity rapidly due to the precipitation of some of the active constituents of the developer solution, and must, therefore, be used within a short time after their preparation. The halogenated products of my invention on the other hand do not precipitate in the presence of hydroquinone under comparable conditions, and can be used for considerable periods after their preparation.

EXAMPLE 10

The following developer formulas were made up:

| Ingredients | I | II |
|---|---|---|
| N-Methyl-4-aminophenol sulfate (Elon)....grams.. | 20 | |
| Bromo-N-methyl-4-aminophenol............do.... | | 25.4 |
| hydrobromides of Example 5. | | |
| Hydroquinone...........................do.... | 40 | 40 |
| Sodium Sulfite..........................do.... | 160 | 160 |
| Boric Acid..............................do.... | 40 | 40 |
| Potassium Hydroxide.....................do.... | 60 | 60 |
| Potassium Carbonate.....................do.... | 75 | 75 |
| Potassium Bromide.......................do.... | 15 | 15 |
| Potassium Iodide........................do.... | 0.04 | 0.04 |
| Water...................................cc.... | 800 | 800 |

In Formula I, a precipitate was obtained after standing overnight, while with Formula II no precipitate had appeared at the end of four months.

EXAMPLE 11

Concentrated developer formulas containing an aminophenol and in addition, the ingredients in the amounts given below were made up.

| | |
|---|---|
| Hydroquinone | g-- 1.0 |
| Sodium sulfite | g-- 4.0 |
| Boric acid | g-- 1.0 |
| Potassium hydroxide | g-- 1.5 |
| Potassium carbonate | g-- 1.875 |
| Potassium bromide | g-- .375 |
| Potassium iodide | g-- .001 |
| Water | cc-- 20 |

*Formula I*

The aminophenol in this case was N-methyl-4-aminophenol sulfate (Elon) and was used in the amount of 0.5 g. The mixture was gently warmed to effect solution, and upon allowing the solution to cool, a precipitate of the aminophenol and hydroquinone appeared almost immediately.

*Formula II*

The aminophenol in this case was the mixture of 2-chloro- and 3-chloro-N-methyl-4-aminophenol salts obtained in Example 1 above and was used in the amount 0.56 g. No precipitation had appeared at the end of four months.

*Formula III*

The aminophenol in this case was the mixture of "dichloro" N-methyl-4-aminophenol hydrochlorides obtained in Example 4 above. No precipitation had occurred after allowing the solution to stand for one month.

The halogenated products used in the above formulas were employed in amounts substantially equimolar to that of the unhalogenated aminophenol in Formula I, so that the speed and contrast measurements of the formulas were of comparable degree. In one important respect, the developer of Formula II was superior to that of Formula I in that the fog level of Formula II was below that of Formula I. The dibrominated products can also be used in the preparation of concentrated developer solutions, however they do not possess the utility shared by the compounds illustrated in Formulas II and III, or Formula II in Example 10. This is probably due to the high molecular weight of the dibromo compounds, which necessitates the use of smaller amounts thereof to avoid precipitation from the solution. Other concentrations of active ingredients can be used in preparing the concentrated developer solutions of my invention, and the above formulas are only by way of illustration.

Instead of chlorinating or brominating the N-methyl-4-aminophenol directly, the chlorine or bromine can be generated in situ, and the aminophenol halogenated indirectly. Such methods generally are less advantageous, however, since it is difficult to control the concentration of the hydrochloric acid under such conditions.

What I claim as my invention and desire secured by Letters Patent of the United States is:

1. A process for halogenating an acid addition salt of N-methyl-4-aminophenol comprising adding a member selected from the group consisting of bromine and chlorine to an acid addition salt of N-methyl-4-aminophenol dissolved in hydrochloric acid containing from 27 to 40 percent by weight of hydrogen chloride, and separating the halogenated products from the reaction mixture.

2. A process for preparing a mixture of 2-chloro-N-methyl-4-aminophenol and 3-chloro-N-methyl-4-aminophenol acid addition salts comprising passing chlorine into a solution of an acid addition salt of N-methyl-4-aminophenol dissolved in hydrochloric acid containing from 27 to 40 per cent by weight of hydrogen chloride, until substantially one molecular equivalent of the chlorine has been absorbed, and separating the mixture of chlorinated products from the reaction mixture.

3. A process for preparing a mixture of 2-chloro-N-methyl-4-aminophenol and 3-chloro-N-methyl-4-aminophenol acid addition salts comprising passing chlorine into a solution of an acid addition salt of N-methyl-4-aminophenol dissolved in hydrochloric acid containing from 30 to 36 per cent by weight of hydrogen chloride until substantially one molecular equivalent of the chlorine has been absorbed, and separating the mixture of chlorinated products from the reaction mixture.

4. A process for perparing a mixture of 2-bromo-N-methyl-4-aminophenol and 3-bromo-N-methyl-4-aminophenol acid addition salts comprising passing bromine into a solution of an acid addition salt of N-methyl-4-aminophenol dissolved in hydrochloric acid containing from 27 to 40 per cent by weight of hydrogen chloride until substantially one molecular equivalent of bromine has been absorbed, and separating the mixture of brominated products from the reaction mixture.

5. A process for preparing a mixture of 2-bromo-N-methyl-4-aminophenol and 3-bromo-N-methyl-4-aminophenol acid addition salts comprising passing bromine into a solution of an acid addition salt of N-methyl-4-aminophenol dissolved in hydrochloric acid containing from 30 to 36 per cent by weight of hydrogen chloride until substantially one molecular equivalent of bromine has been absorbed, and separating the mixture of brominated products from the reaction mixture.

6. A process for preparing a mixture of acid addition salts of dichloro-N-methyl-4-aminophenols comprising passing chlorine into a solution of an acid addition salt of N-methyl-4-aminophenol dissolved in hydrochloric acid containing from 27 to 40 per cent by weight of hydrogen chloride until substantially two molecular equivalents of chlorine have been absorbed, and separating the mixture of dichlorinated products from the reaction mixture.

7. A process for preparing a mixture of acid addition salts of dichloro-N-methyl-4-aminophenols comprising passing chlorine into a solution of an acid addition salt of N-methyl-4-aminophenol dissolved in hydrochloric acid containing from 30 to 36 per cent by weight of hydrogen chloride until substantially two molecular equivalents of chlorine have been absorbed, and separating the mixture of dichlorinated products from the reaction mixture.

8. A process for preparing a mixture of 2-chloro-N-methyl-4-aminophenol and 3-chloro-N-methyl-4-aminophenol acid addition salts comprising passing chlorine into a solution of N-methyl-4-aminophenol sulfate dissolved in hydrochloric acid containing from 30 to 36 per cent by weight hydrogen chloride until substantially one molecular equivalent of chlorine has been absorbed, and separating the mixture of chlorinated products from the reaction mixture.

FREDERIC R. BEAN.

REFERENCES CITED

The following references are of record in the file of this patent:

UNITED STATES PATENTS

| Number | Name | Date |
|---|---|---|
| 807,782 | Schmidt | Dec. 19, 1905 |
| 1,930,754 | Havas et al. | Oct. 17, 1933 |
| 2,060,594 | Schneider et al. | Nov. 10, 1936 |